United States Patent
Robinson et al.

(10) Patent No.: US 9,947,184 B2
(45) Date of Patent: Apr. 17, 2018

(54) ENABLING INTERCHANGEABILITY OF SENSOR DEVICES ASSOCIATED WITH A USER DEVICE

(71) Applicant: Verizon Patent and Licensing Inc., Arlington, VA (US)

(72) Inventors: Quentin N. Robinson, Willingboro, NJ (US); Shamik Basu, Lake Hiawatha, NJ (US); Layton R. Diament, San Francisco, CA (US); Desirae Dolphin, Piscataway, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 15/095,603

(22) Filed: Apr. 11, 2016

(65) Prior Publication Data
US 2017/0294085 A1    Oct. 12, 2017

(51) Int. Cl.
| G08B 5/22 | (2006.01) |
| G08B 29/18 | (2006.01) |
| G08C 19/16 | (2006.01) |
| H04L 29/08 | (2006.01) |

(52) U.S. Cl.
CPC ............ *G08B 5/22* (2013.01); *G08B 29/185* (2013.01); *G08C 19/16* (2013.01); *H04L 67/12* (2013.01)

(58) Field of Classification Search
CPC ........ G08B 5/22; G08B 29/185; G08C 19/16; H04L 67/12; H04W 4/001; H04W 60/00; H04W 84/18
USPC ............... 340/508, 539.11; 700/9; 709/217; 717/107
See application file for complete search history.

(56) References Cited

U.S. PATENT DOCUMENTS

| 5,857,777 A * | 1/1999 | Schuh .................... G01K 15/00 374/170 |
| 2010/0100829 A1* | 4/2010 | Laberge ............... F24F 11/0012 715/762 |
| 2010/0249540 A1* | 9/2010 | Lisogurski ........... A61B 5/0002 600/301 |
| 2014/0375428 A1* | 12/2014 | Park ................... G06K 7/10237 340/10.1 |
| 2015/0297134 A1* | 10/2015 | Albert .................... A61B 5/681 600/384 |
| 2016/0081572 A1* | 3/2016 | Hong .................. A61B 5/0404 600/301 |
| 2016/0157779 A1* | 6/2016 | Baxi .................... A61B 5/6831 600/301 |
| 2016/0378153 A1* | 12/2016 | Kelly ..................... G06F 1/266 710/313 |
| 2017/0153313 A1* | 6/2017 | Tsai ....................... G01C 21/14 |
| 2017/0316657 A1* | 11/2017 | de Jong ................... G08B 5/22 |

* cited by examiner

*Primary Examiner* — Quan-Zhen Wang
*Assistant Examiner* — Stephen Burgdorf (57) ABSTRACT

A user device may detect a connect event associated with a sensor device. The user device may be associated with a first sensor, and the sensor device may be associated with a second sensor. The user device may identify the second sensor based on detecting the connect event associated with the sensor device. The user device may replace the first sensor with the second sensor based on identifying the second sensor associated with the sensor device. The user device may provide data associated with the second sensor for use by an application of the user device.

21 Claims, 8 Drawing Sheets

ENABLING INTERCHANGEABILITY OF SENSOR DEVICES ASSOCIATED WITH A USER DEVICE

BACKGROUND

A user device, such as a smart watch, may include various built-in sensors that measure various data, such as motion, orientation, and/or an environmental condition. A sensor may detect a change in the data and may produce a corresponding output.

DETAILED DESCRIPTION OF PREFERRED EMBODIMENTS

The following detailed description of example implementations refers to the accompanying drawings. The same reference numbers in different drawings may identify the same or similar elements.

A user device, such as a smart watch, may include a removable strap. For example, a user of the user device may interchange various straps associated with the user device. In some cases, a strap may extend the functionality of the user device. For example, the strap (e.g., a smart strap) may include a sensor, a battery, or the like. The user of the user device may interchange straps to provide additional functionality to the user device. However, in some cases, if the user attempts to connect a strap that includes additional sensors (e.g., perform a hot-swap or hot-plug), then the user device may not function properly (e.g., an operating system associated with the user device may crash). Implementations described herein may enable a user device to dynamically connect to and/or disconnect from a smart strap without causing the user device to generate an operating error, without requiring the user device to reboot, and/or without requiring the user device to restart an application, thereby conserving processor and/or memory resources.

Figure 1A:
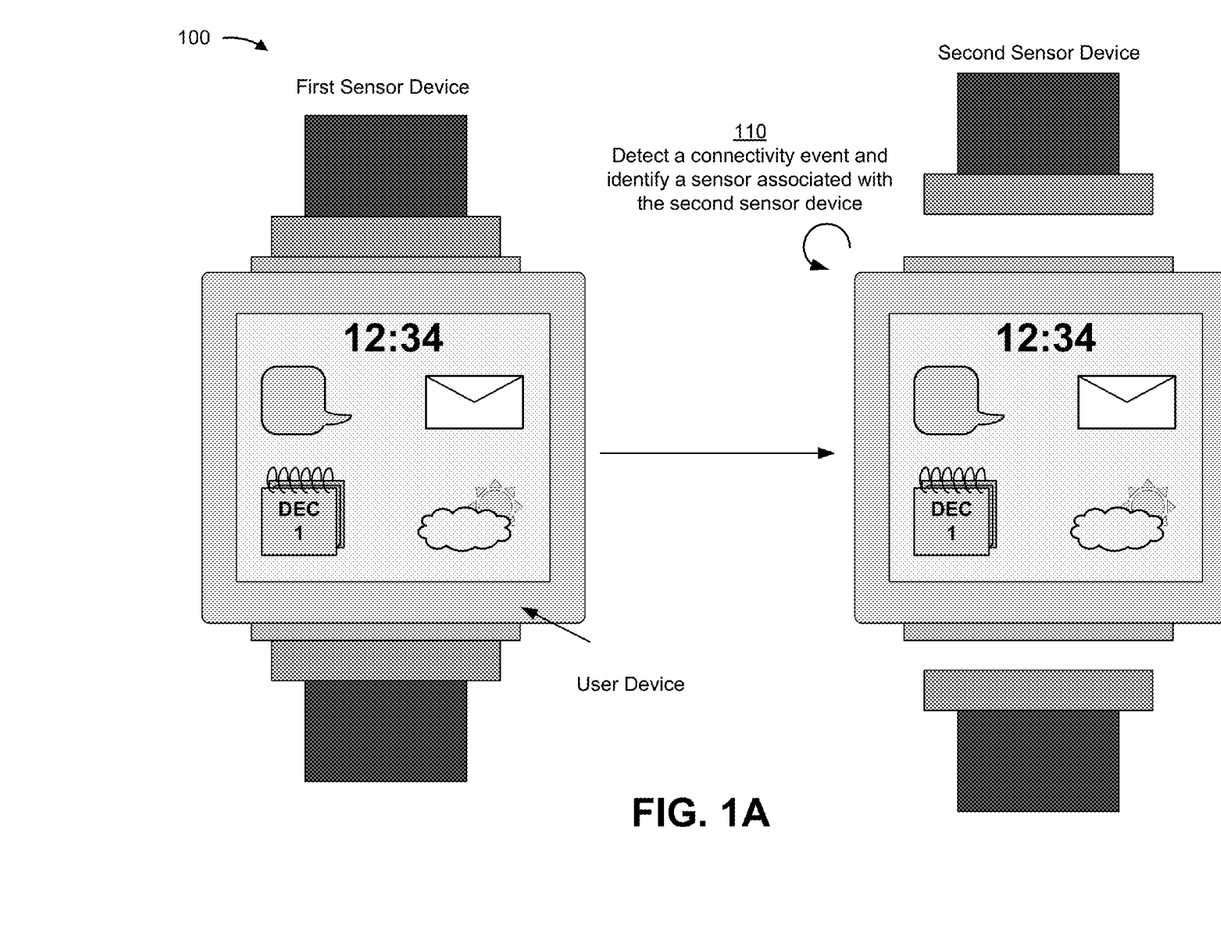
FIGS. 1A and 1B are diagrams of an overview of an example implementation described herein.
Figure 1B:
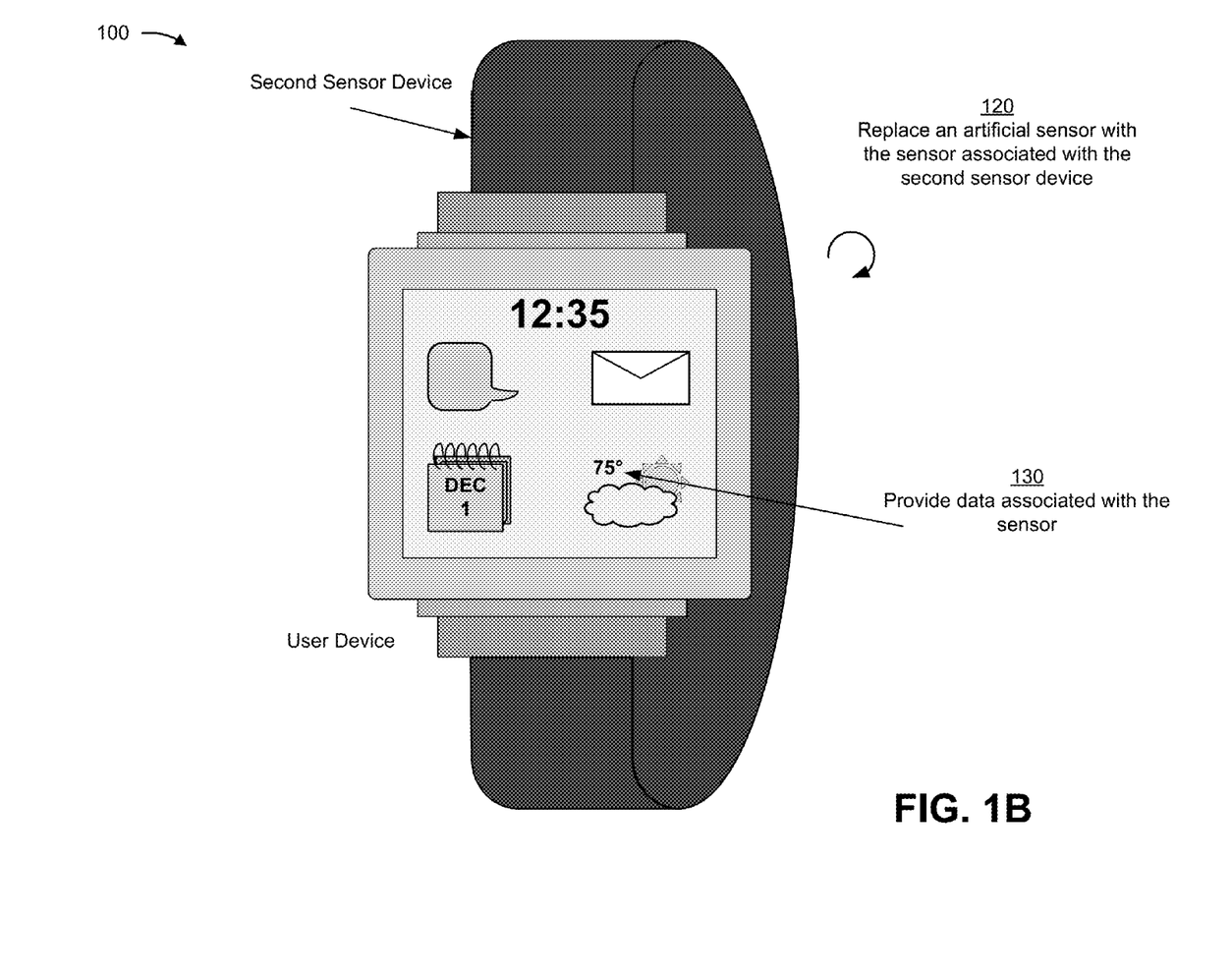

FIGS. 1A and 1B are diagrams of an overview of an example implementation 100 described herein. As shown in FIG. 1A, a user device (e.g., a smart watch) may initially be connected to a first sensor device (e.g., a smart strap). The user device may include multiple sensors (e.g., actual and/or potential sensors). For example, the user device may load drivers associated with actual and/or potential sensors. An actual sensor may be a sensor that is in operation and/or communicating with the user device. Additionally, an actual sensor may be a sensor that is providing, or is capable of providing, data to an application associated with the user device. Additionally, a potential sensor may represent a sensor that is not currently in operation and/or communicating with the user device. For example, the user device may load drivers associated with an accelerometer and an ambient temperature sensor. However, the user device may not be in communication with an ambient temperature sensor (e.g., the ambient temperature sensor is a potential sensor). The user device may load multiple sensors (e.g., sensor configurations and/or drivers) when an operating system associated with the user device is booted. In this way, an operating system and/or an application associated with the user device may determine which sensors are actual sensors and which sensors are potential sensors. Additionally, the user device may receive data from an actual sensor when the actual sensor replaces a potential sensor and/or is in communication with the user device.

As shown by reference number 110, the user device may detect a connectivity event and may identify a sensor associated with the second sensor device. For example, assume that a user interchanges the first sensor device with a second sensor device (e.g., performs a hot-swap operation). For example, assume that the second sensor device includes an ambient temperature sensor. Further, assume that the user device and the first sensor device do not include an actual ambient temperature sensor.

As shown in FIG. 1B, and by reference number 120, the user device may replace a potential sensor with the sensor associated with the second sensor device. For example, the user device may replace a potential ambient temperature sensor with the ambient temperature sensor associated with the second sensor device. As shown by reference number 130, the user device may provide data associated with the sensor. For example, the user device may provide ambient temperature data to an application (e.g., a weather application) associated with the user device. In this way, the user device may provide information for display based on the data associated with the ambient temperature sensor.

As indicated above, FIGS. 1A and 1B are provided merely as an example. Other examples are possible and may differ from what was described with regard to FIGS. 1A and 1B.

Implementations described herein may assist a user device in dynamically interchanging sensor devices without generating an operating error, without requiring that the user device reboot, and/or without requiring that an application restart, thereby conserving processor and/or memory resources. Additionally, implementations described herein may assist a user device in extending functionality based on connecting to a sensor device that includes additional sensors.

Figure 2:
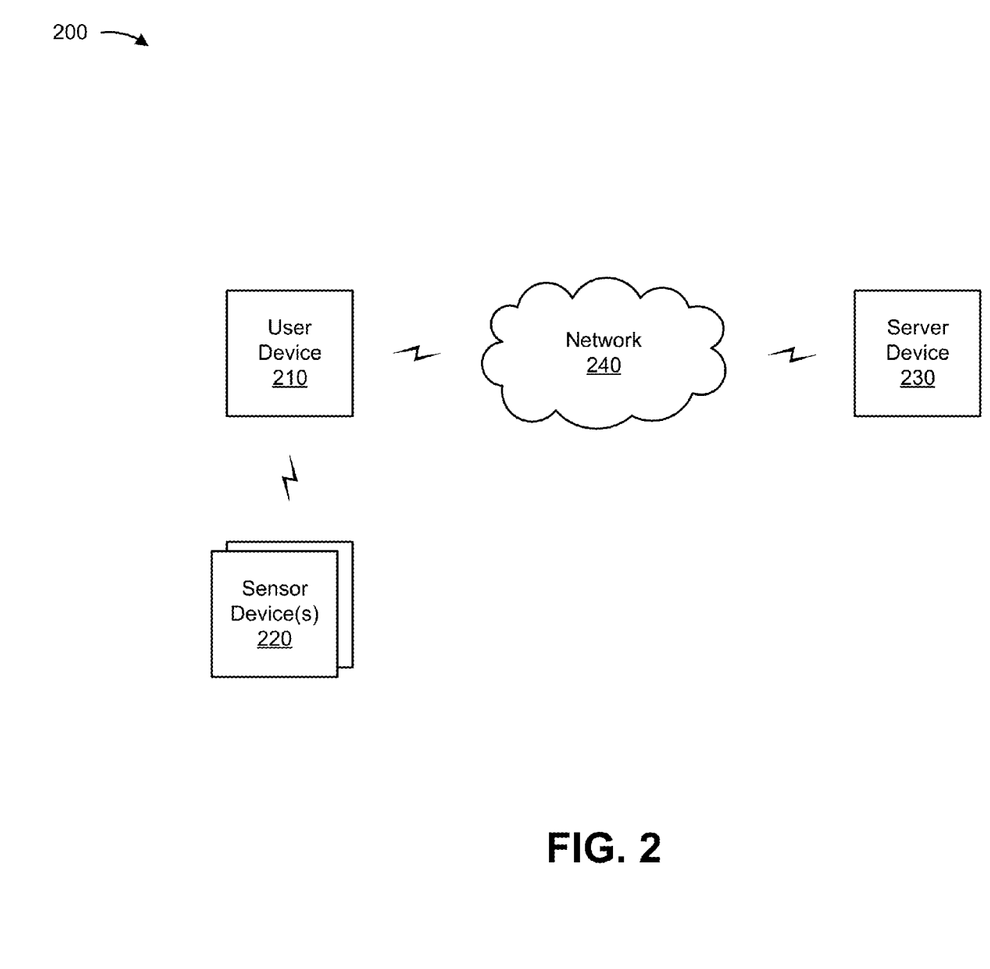
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more sensor devices 220 (hereinafter referred to collectively as "sensor devices 220," and individually as "sensor device 220"), a server device 230, and a network 240. Devices of environment 200 may interconnect via wired connections, wireless connections, or a combination of wired and wireless connections.

User device 210 includes one or more devices capable of receiving, generating, storing, processing, and/or providing information associated with a sensor. For example, user device 210 may include a communication and/or computing device, such as a wearable communication device (e.g., a smart wristwatch, an activity band, or a pair of smart eyeglasses), a mobile phone (e.g., a smart phone or a radiotelephone, etc.), a laptop computer, a tablet computer, a handheld computer, a gaming device, or a similar type of device.

Sensor device 220 includes one or more devices capable of receiving, generating, storing, processing, and/or providing information associated with a sensor. For example, user device 210 may include a communication and/or computing device, such as a wearable communication device (e.g., a smart strap, a smart band, a security band, or an activity band), a dongle, or the like.

Server device 230 includes one or more devices capable of receiving, generating, storing, processing, and/or providing information associated with a sensor. In some implementations, server device 230 may include a communication interface that allows server device 230 to receive information from and/or transmit information to other devices in environment 200. For example, server device 230 may provide, to user device 210, information that identifies a sensor associated with sensor device 220, an application associated with sensor device 220, or the like.

Network 240 may include one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
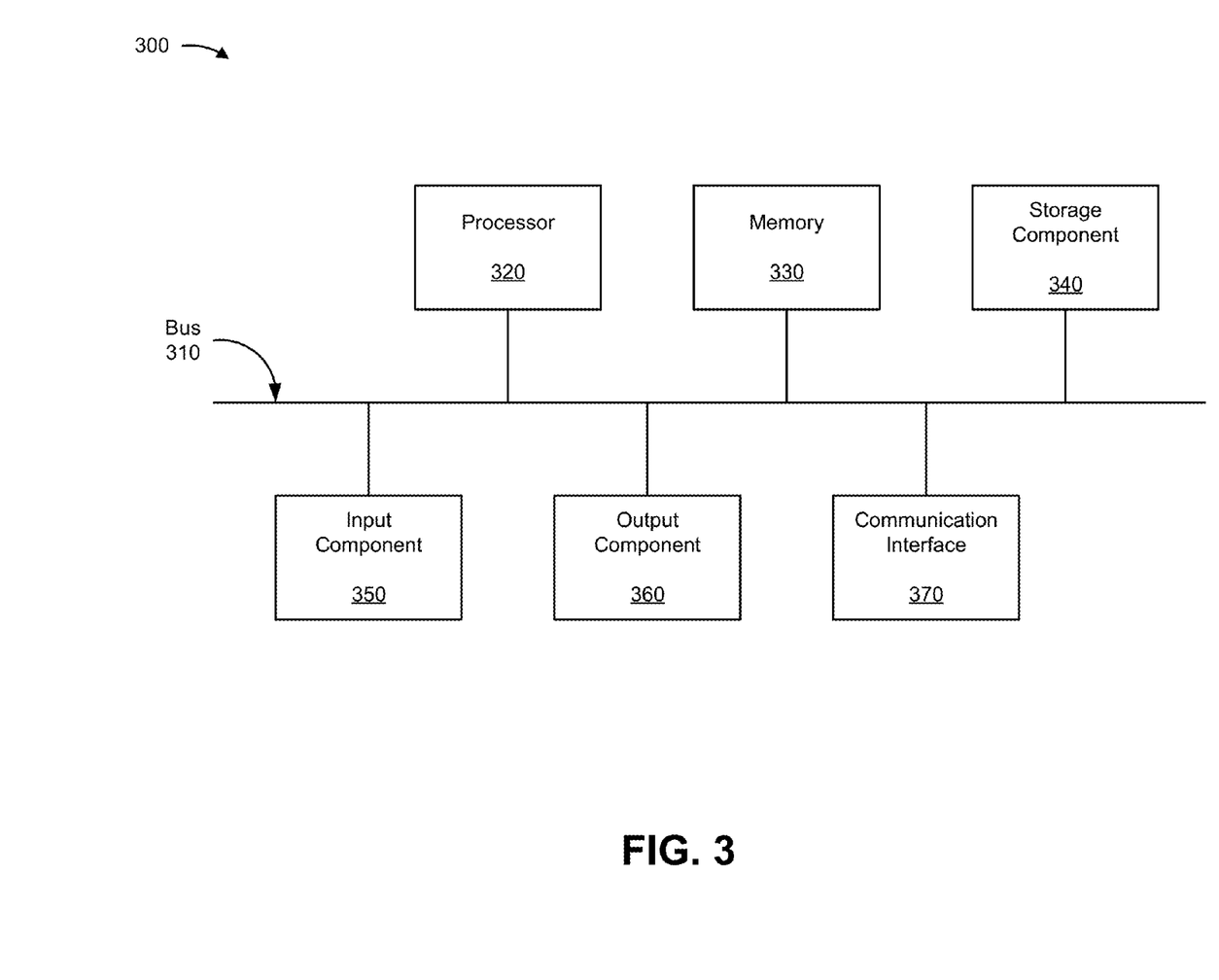
FIG. 3 is a diagram of example components of one or more devices of FIG. 2.

FIG. 3 is a diagram of example components of a device 300. Device 300 may correspond to user device 210, sensor device 220, and/or server device 230. In some implementations, user device 210, sensor device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an ambient temperature sensor, a gravity sensor, a barometer, a proximity sensor, an ultraviolet light sensor, a pressure sensor, a heart-rate sensor, a body temperature sensor, a magnetometer, a pedometer, a fingerprint sensor, a radiation sensor, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
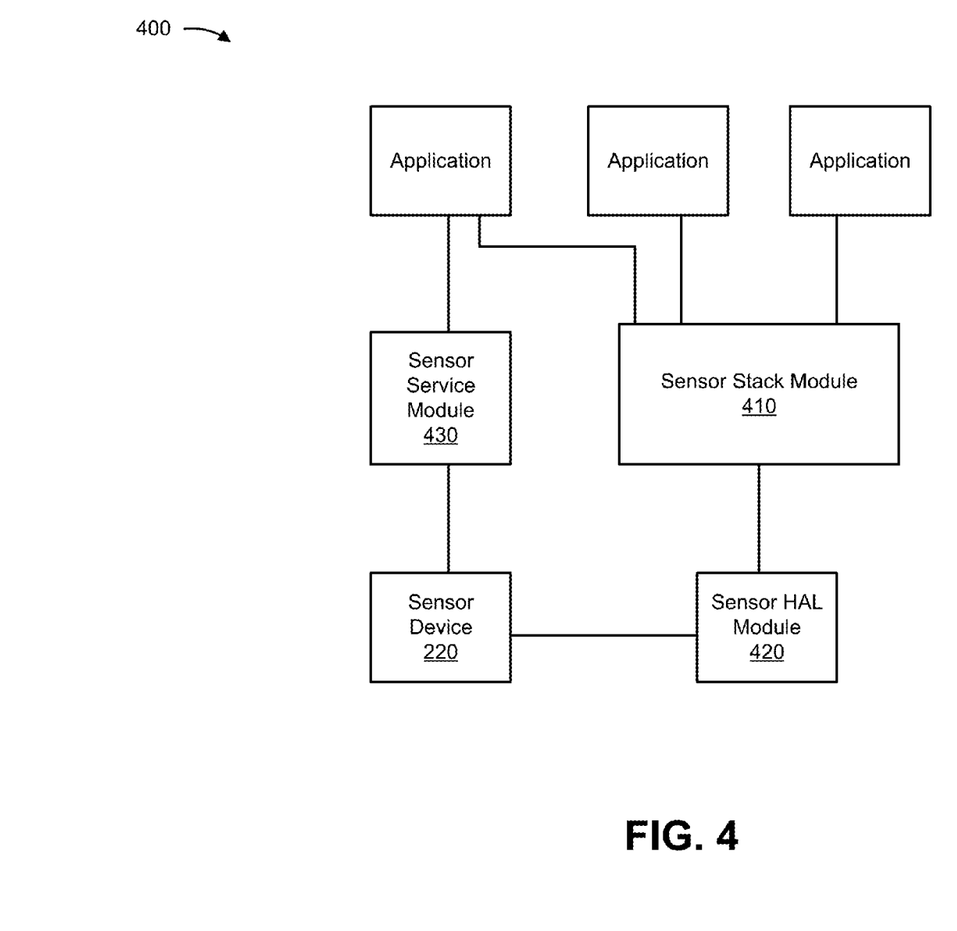
FIG. 4 is a diagram of example functional modules of one or more devices of FIG. 2.

FIG. 4 is a diagram of example functional modules of a device 400. Device 400 may correspond to user device 210 and/or sensor device 220. In some implementations, user device 210 and/or sensor device 220 may include one or more devices 400 and/or one or more functional modules of device 400. As shown in FIG. 4, device 400 may include a sensor stack module 410, a sensor hardware abstraction layer (HAL) module 420, and a sensor service module 430.

Sensor stack module 410 includes a module that provides an interface between sensor HAL module 420 and an application. Sensor stack 410 may receive information from sensor HAL module 420 that identifies a list of sensors, and may provide the list of sensors to an application. Sensor stack module 410 may receive a request from an application to receive sensor data, and may provide a request to sensor HAL module 420 to activate a sensor. Sensor stack module 410 may receive sensor data from sensor HAL module 420, and may provide the sensor data to an application.

Sensor HAL module 420 includes a module that provides an interface between sensor stack module 410 and a sensor device 220. Sensor HAL module 420 may provide a list of sensors to sensor stack module 410 (e.g., actual sensors and/or potential sensors), may activate and deactivate a sensor, and/or may configure a sensor parameter. Sensor HAL module 420 may detect a connectivity event associated with sensor device 220 and may replace a potential sensor with an actual sensor based on that connectivity event. Sensor HAL module 420 may obtain data from a sensor and provide the data to sensor stack module 410.

Sensor service module 430 includes a module that detects connectivity events associated with sensor device 220. Sensor service module 430 may determine an application associated with sensor device 220, and may execute the application on user device 210 based on detecting a connectivity event. Sensor service module 430 may provide information to an application that indicates that a sensor is connected to user device 210.

The number and arrangement of functional modules shown in FIG. 4 are provided as an example. In practice, device 400 may include additional functional modules, fewer functional modules, different functional modules, or differently arranged functional modules than those shown in FIG. 4. Additionally, or alternatively, a set of functional modules (e.g., one or more functional modules) of device 400 may perform one or more functions described as being performed by another set of functional modules of device 400.

Figure 5:
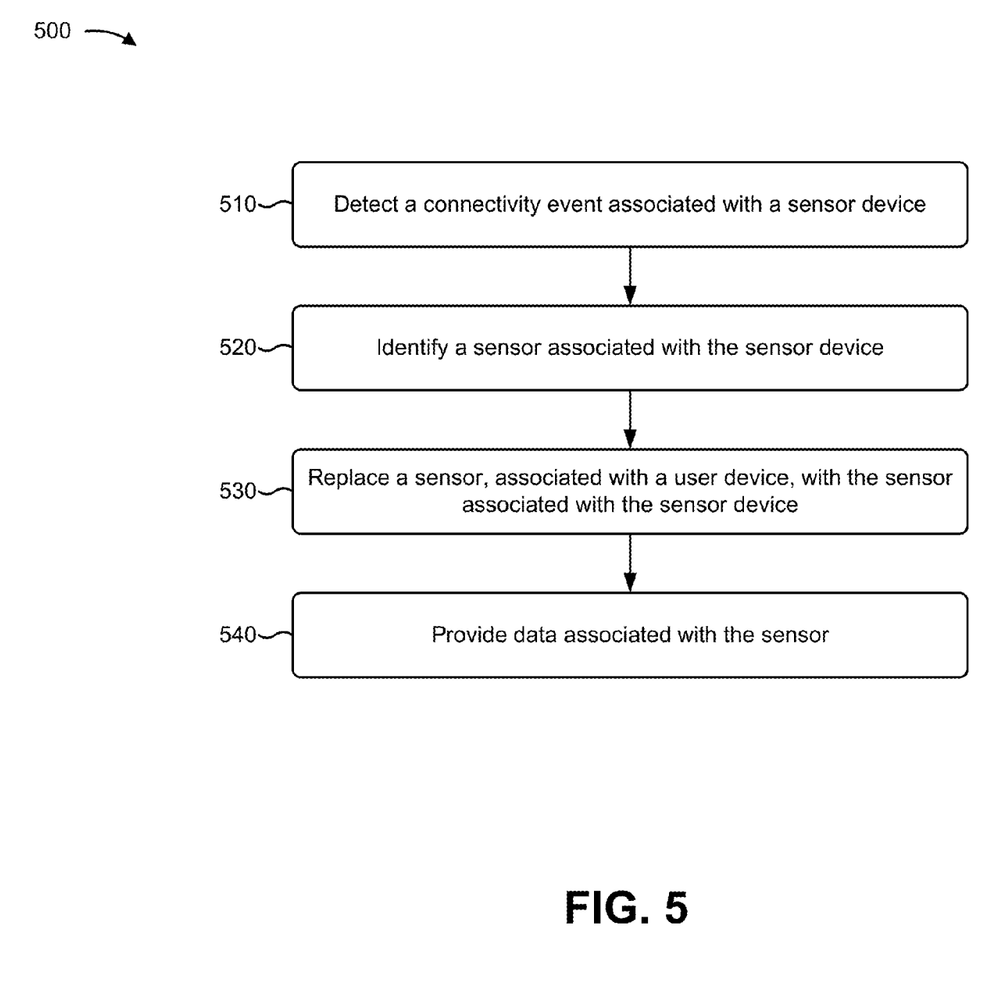
FIG. 5 is a flow chart of an example process for enabling interchangeability of sensor devices associated with a user device.

FIG. 5 is a flow chart of an example process 400 for enabling interchangeability of sensor devices associated with a user device. In some implementations, one or more process blocks of FIG. 5 may be performed by user device 210. In some implementations, one or more process blocks of FIG. 5 may be performed by another device or a group of devices separate from or including user device 210, such as sensor device 220 and/or server device 230.

As shown in FIG. 5, process 500 may include detecting a connectivity event associated with a sensor device (block 510). For example, user device 210 may detect a connect event and/or a disconnect event associated with sensor device 220. In some implementations, the connectivity event may include an interchange of a first sensor device 220 with a second sensor device 220. For example, a user may disconnect a first sensor device 220 from user device 210 and may connect a second sensor device 220 to user device 210.

In some implementations, user device 210 may include multiple sensors (e.g., one or more sensors that are native to user device 210). For example, user device 210 may include an actual sensor and/or a potential sensor. In some implementations, an actual sensor may represent a sensor that is in operation and/or in communication with user device 210. Additionally, or alternatively, a potential sensor may represent a sensor that is capable of being in communication with user device 210, however is not currently in operation and/or in communication with user device 210. In some implementations, user device 210 may include multiple types of sensors (e.g., a temperature sensor and an accelerometer). Additionally, or alternatively, user device 210 may include multiple sensors of the same type (e.g., multiple temperature sensors).

In some implementations, user device 210 may load an actual sensor and/or a potential sensor (e.g., may load a sensor configuration and/or a sensor driver) when user device 210 is powered on (e.g., an operating system associated with user device 210 is booted), when user device 210 is rebooted, when instructed by a user of user device 210, or the like. In this way, an operating system and/or an application associated with user device 210 may determine that particular sensors (e.g., a list of actual and/or potential sensors) are available to provide data. In some implementations, an application associated with user device 210 may determine a list of available sensors (e.g., actual sensors and/or potential sensors) associated with user device 210, and may register to receive data from an available sensor. Additionally, or alternatively, an application may identify a list of sensors associated with user device 210 (e.g., actual and/or potential sensors), and may identify an actual sensor from the list of sensors and may register to receive data from the actual sensor.

In some implementations, user device 210 may execute an application based on detecting a connectivity event. For example, user device 210 may store information (e.g., in a data structure, such as a table) that identifies an application associated with sensor device 220. In some implementations, user device 210 may identify a device identifier associated with sensor device 220 and may identify an application (e.g., based on an application identifier) that is associated with the device identifier. Additionally, or alternatively, user device 210 may execute the application based on detecting that sensor device 220 is connected to user device 210. In this way, the application may receive data associated with a sensor of sensor device 220, and may provide information for display based on receiving the data, as described elsewhere herein. Additionally, or alternatively, a user may configure user device 210 to execute a particular application or provide a list of particular applications for display based on user device 210 detecting a connect event associated with sensor device 220.

As further shown in FIG. 5, process 500 may include identifying a sensor associated with the sensor device (block 520). For example, user device 210 may identify a sensor associated with sensor device 220. In some implementations, user device 210 may receive information identifying sensor device 220 (e.g., a device identifier), a quantity of sensors associated with sensor device 220, a type of a sensor associated with sensor device 220, a configuration of a sensor associated with sensor device 220, or the like, based on connecting to sensor device 220. In this way, user device 210 may replace a sensor associated with user device 210 with a sensor associated with sensor device 220, as described below.

In some implementations, user device 210 may provide a prompt (e.g., via a display of user device 210) that suggests particular applications to execute based on identifying the sensor associated with sensor device 220. In some implementations, user device 210 may store information (e.g., in a data structure, such as a table) that includes a list of applications associated with user device 210 and corresponding sensors associated with the respective applications (e.g., sensors that may provide data to the respective applications). Additionally, or alternatively, user device 210 may identify a sensor associated with a particular application based on the stored information (e.g., may perform a look-up). For example, assume that sensor device 220 includes a heart-rate sensor. In this case, user device 210 may identify particular applications associated with user device 210 that may use data associated with a heart-rate sensor, and may provide a prompt for display that identifies the particular applications. In this way, a user may select a particular application to execute.

In some implementations, user device 210 may identify (e.g., based on performing a look-up) a list of applications associated with the sensor of sensor device 220, and may identify particular applications from the list to display. For example, user device 210 may identify particular applications that are associated with the sensor and that have been used most recently, most frequently, or the like, and may provide information regarding the particular applications, based on these factors, for display.

As further shown in FIG. 5, process 500 may include replacing a sensor, associated with a user device, with the sensor associated with the sensor device (block 530). For example, user device 210 may replace an actual sensor or a potential sensor, associated with user device 210, with a sensor associated with sensor device 220. In some implementations, user device 210 may identify a potential sensor, associated with user device 210, that corresponds to a sensor associated with sensor device 220. For example, assume that sensor device 220 includes an ambient temperature sensor. In this case, user device 210 may identify a potential ambient temperature sensor associated with user device 210 and may replace the potential ambient temperature sensor with the ambient temperature sensor associated with sensor device 220. In this way, an application, associated with user device 210, may receive data associated with a sensor of sensor device 220, as described below.

In some implementations, user device 210 may automatically replace an actual sensor, associated with user device 210, with a sensor associated with sensor device 220. For example, user device 210 may identify an actual sensor, associated with user device 210, that corresponds to a sensor associated with sensor device 220. In some implementations, user device 210 may provide a notification (e.g., a prompt) for display that indicates that user device 210 may replace an actual sensor, associated with user device 210, with a sensor associated with sensor device 220. In this way, a user may select to replace the actual sensor with the sensor associated with sensor device 220. Alternatively, a user may select to not replace the actual sensor with the sensor associated with sensor device 220 (e.g., may elect to continue to use the actual sensor associated with user device 210).

In some implementations, user device 210 may translate data received from a sensor of sensor device 220. For example, if user device 210 replaces an actual sensor, associated with user device 210, with a sensor of sensor device 220, then user device 210 may translate data received from the sensor of sensor device 220 to match data output by the actual sensor of user device 210. In some implementations, user device 210 may identify a format of sensor data associated with an actual sensor of user device 210. Additionally, user device 210 may identify a format of sensor data associated with a sensor of sensor device 220. For example, user device 210 may receive information, from sensor device 220, that identifies a format of sensor data. Additionally, or alternatively, user device 210 may identify information (e.g., based on performing an internal or external look-up) that identifies a format of sensor data associated with a sensor of sensor device 220. Additionally, or alternatively, user device 210 may translate data associated with a sensor of sensor device 220 such that the translated data matches a data format of a sensor associated with user device 210.

In some implementations, user device 210 may provide information, to an application associated with user device 210, that identifies that a sensor associated with sensor device 220 is available to provide data. In this way, an application may register or configure itself to receive data associated with the sensor of sensor device 220. Additionally, or alternatively, an application may enable a feature that relies on data associated with the sensor associated with sensor device 220.

In some implementations, an operating system and/or an application associated with user device 210 may determine that a list of sensors that are available to provide data remains unchanged based on user device 210 replacing the sensor of user device 210 with the sensor of sensor device 220. For example, an operating system and/or an application may determine that a first list of sensors (e.g., the list of sensors that were available when user device 210 was powered on, booted up, instructed to determine the list, or the like) is the same as a second list of sensors (e.g., the list of sensors that are available based on replacing the sensor of user device 210 with the sensor of sensor device 220). In this way, the list of sensors that are available to provide data may remain unchanged despite one or more potential sensors being replaced with actual sensors, or vice versa. Additionally, user device 210 may load a potential sensor (e.g., a driver associated with a potential sensor) when user device 210 is booted, and may provide data associated with an actual sensor, corresponding to the potential sensor, when the actual sensor is connected to user device 210. In this way, user device 210 may interchange sensor devices 220 without generating an operating error, without rebooting, and/or without restarting an application, thereby conserving processor and/or memory resources.

As further shown in FIG. 5, process 500 may include providing data associated with the sensor (block 540). For example, user device 210 may provide, to an application associated with user device 210, data associated with a sensor of sensor device 220. In some implementations, an application associated with user device 210 may receive data associated with the sensor of sensor device 220 and may update screen information (e.g., content) being provided for display via user device 210.

In some implementations, user device 210 may detect a disconnect event associated with sensor device 220. Additionally, or alternatively, user device 210 may identify a sensor associated with sensor device 220 and may replace the sensor with a potential sensor or an actual sensor associated with user device 210. For example, assume that a user disconnects sensor device 220 that includes a heart-rate sensor and an ultraviolet light sensor. In this case, user device 210 may replace the heart-rate sensor and the ultraviolet light sensor with potential sensors or actual sensors associated with user device 210. In this way, an operating system and/or an application associated with user device 210 may determine that the heart-rate sensor and the ultraviolet light sensor are still available to provide data despite sensor device 220 being disconnected from user device 210.

In this way, a user may extend the functionality of user device 210 by interchanging sensor devices 220. Implementations described herein may assist user device 210 in enabling interchangeability of sensor devices 220 without generating an operating error, without requiring that user device 210 reboot, and/or without requiring that user device 210 restart an application, thereby conserving processor and/or memory resources of user device 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
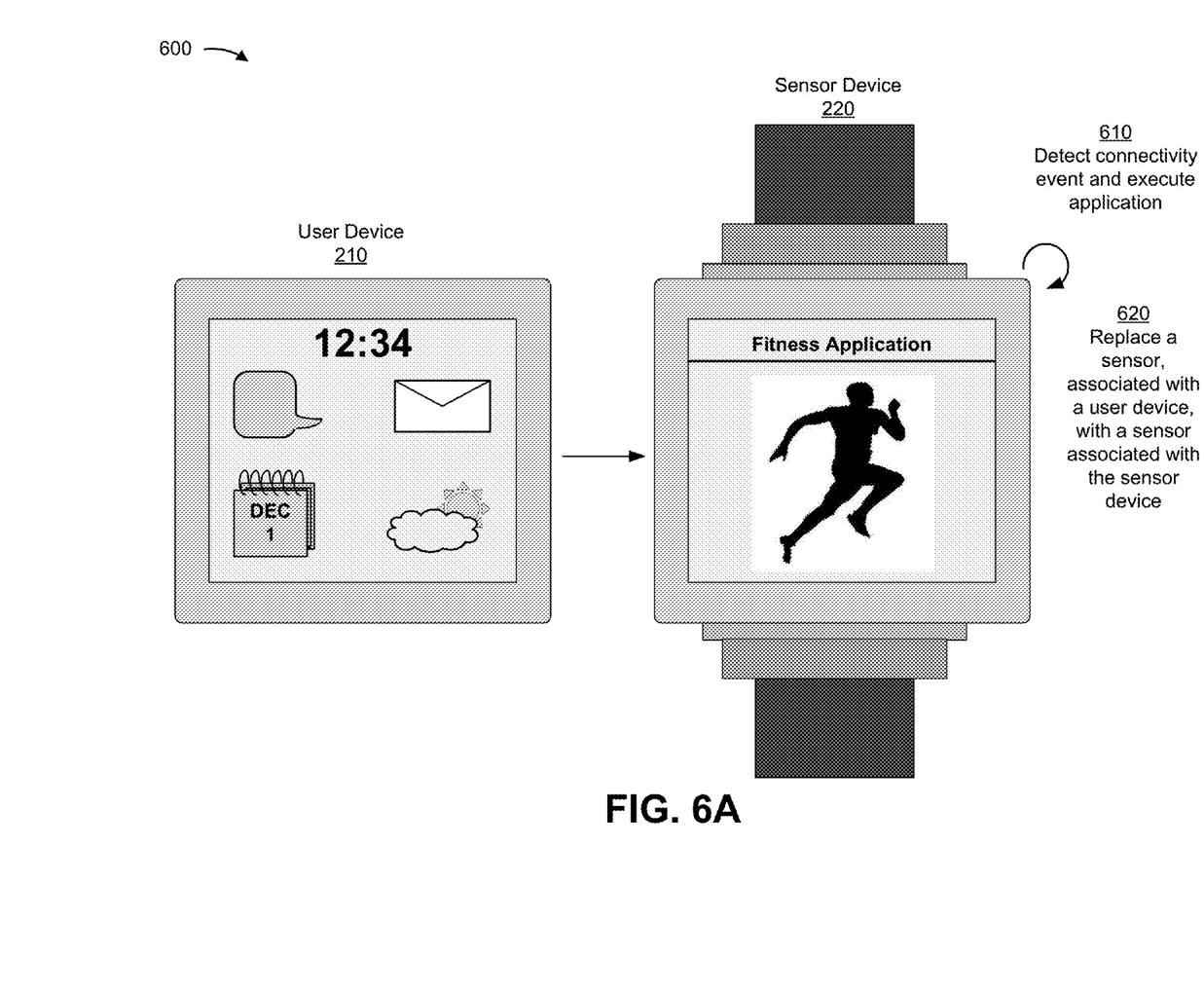
FIGS. 6A and 6B are diagrams of an example implementation relating to the example process shown in FIG. 5.
Figure 6B:
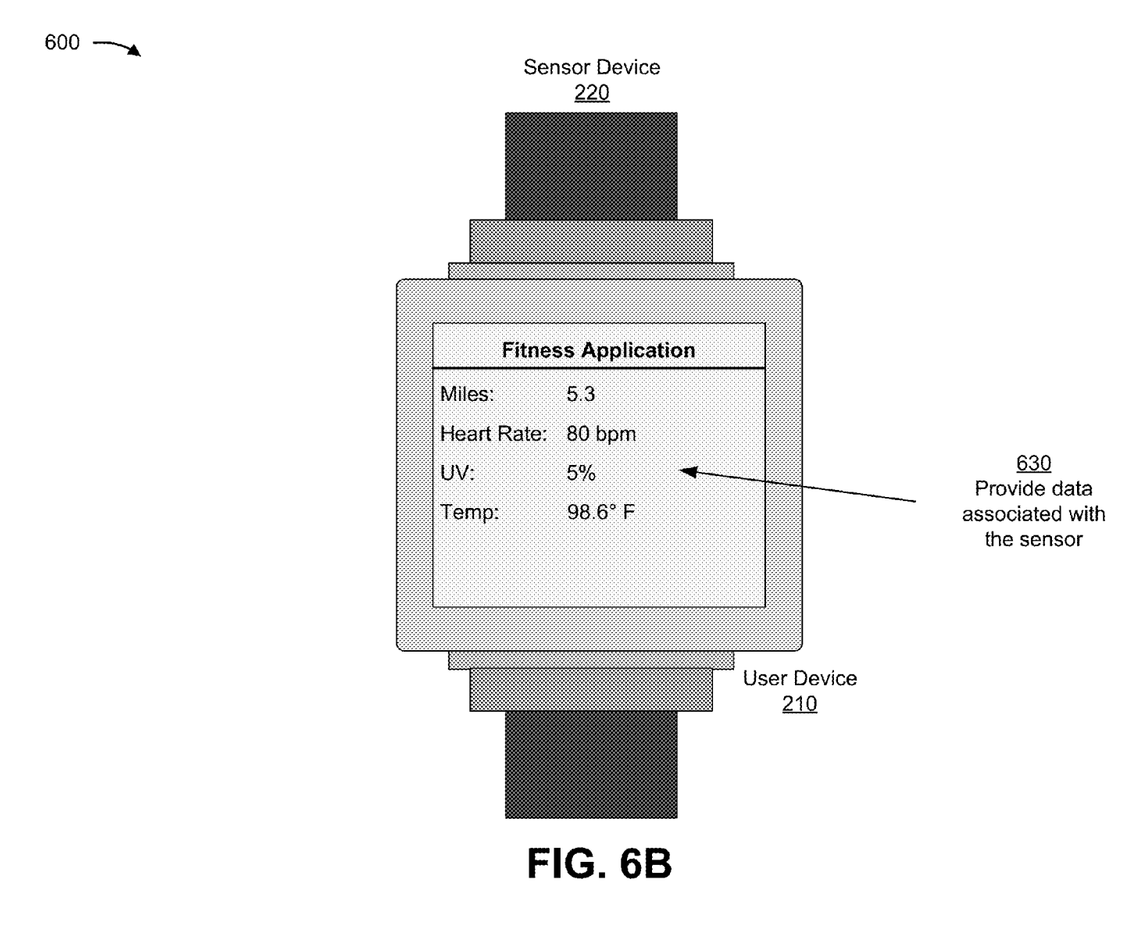

FIGS. 6A and 6B are diagrams of an example implementation 600 relating to example process 500 shown in FIG. 5. FIGS. 6A and 6B show an example of enabling interchangeability of sensor devices associated with a user device.

As shown in FIG. 6A, assume that a user connects sensor device 220 to user device 210. As shown by reference number 610, user device 210 (e.g., sensor HAL module 420 and/or sensor service module 430) may detect a connectivity event and may execute an application. For example, assume that sensor device 220 includes a heart-rate sensor, an ultraviolet light sensor, and a body temperature sensor. User device 210 (e.g., sensor service module 430) may identify an application (e.g., a fitness application) associated with sensor device 220, and may execute the application based on detecting the connectivity event. For example, assume that sensor device 220 includes information identifying the fitness application, and provides information identifying the fitness application to user device 210. User device 210 may execute the fitness application based on receiving the information that identifies the fitness application.

As shown by reference number 620, user device 210 may replace a sensor, associated with user device 210, with a sensor associated with sensor device 220. For example, user device 210 (e.g., sensor HAL module 420) may identify a potential heart-rate sensor, a potential ultraviolet light sensor, and a potential body temperature sensor, and may replace the potential sensors with sensors associated with sensor device 220. For example, user device 210 (e.g., sensor HAL module 420) may load drivers associated with the potential sensors when user device 210 is booted. In this way, user device 210 (e.g., sensor HAL module 420 and/or sensor stack module 410) may provide data associated with actual sensors, corresponding to the potential sensors, based on replacing the potential sensors with actual sensors.

As shown by reference number 630, user device 210 (e.g., sensor HAL module 420 and/or sensor stack module 410) may provide data associated with the sensors of sensor device 220. For example, user device 210 may provide data associated with the heart-rate sensor, the ultraviolet light sensor, and the body temperature sensor to the fitness application. In this way, user device 210 may provide information for display that identifies the data associated with sensor device 220.

As indicated above, FIGS. 6A and 6B are provided merely as an example. Other examples are possible and may differ from what was described with regard to FIGS. 6A and 6B.

Implementations described herein may assist a user in extending the functionality of a user device. Additionally, implementations described herein may assist a user device in enabling interchangeability of sensor devices without generating an operating error, thereby conserving processor and/or memory resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A wearable device, comprising:
   one or more memories; and
   one or more processors, communicatively coupled to the one or more memories, to:
   identify a list of a plurality of sensor devices,
      the list of the plurality of sensor devices being provided in a sensor hardware abstraction layer (HAL) included in the wearable device, and
      the plurality of sensor devices including at least one potential sensor device and at least one actual sensor device;
   load a plurality of sensor drivers associated with the plurality of sensor devices on the wearable device,
      the plurality of sensor drivers including:
         at least one first sensor driver for a first sensor device of the plurality of sensor devices,
            the first sensor device not being connected to or in communication with the wearable device, and
            the first sensor device being associated with a first removable strap,
         at least one second sensor driver for a second sensor device of the plurality of sensor devices,
            the second sensor device being connected to or in communication with the wearable device,
            the second sensor device being associated with a second removable strap, and
            the second sensor device being a different type of sensor device than the first sensor device, and
         the wearable device using the at least one second sensor driver in connection with the second sensor device,
   detect a connectivity event,
      the connectivity event including:
         a disconnection of the second sensor device from the wearable device, and
         a connection of the first sensor device; identify the first sensor device based on detecting the connectivity event;
   cause the first sensor device to be used in connection with the wearable device based on detecting the connectivity event and based on identifying a first sensor associated with the first sensor device,
      the first sensor device being used without rebooting the wearable device and without restarting an application, of the wearable device, that uses the first sensor device;
   replace second data with first data,
      the first data including data associated with the first sensor, and
      the second data including data associated with a second sensor,
         the second sensor being associated with the second sensor device;
   provide the first data associated with the first sensor device to the application of the wearable device.

2. The wearable device of claim 1, where the one or more processors are further to:
   identify the application based on detecting the connectivity event and based on identifying the first sensor,
      the application being responsible for displaying the data associated with the first sensor.

3. The wearable device of claim 1, where the one or more processors are further to:
   provide a notification to the application,
      the notification including information identifying the first sensor.

4. The wearable device of claim 1, where the one or more processors are further to:
   receive information that identifies a user configuration;
   identify one or more applications based on identifying the first sensor,
      the one or more applications being identified based on the user configuration; and
   provide information that identifies the one or more applications for display.

5. The wearable device of claim 1, where the one or more processors are further to:
   translate the first data associated with first sensor to match a data format of the second data associated with the second sensor.

6. The wearable device of claim 1, where the application associated with the wearable device is to:
   register to receive data from the at least one actual sensor device.

7. A non-transitory computer-readable medium storing instructions, the instructions comprising:
   one or more instructions that, when executed by one or more processors of a wearable device, cause the one or more processors to:
   identify a list of a plurality of sensor devices,
      the list of the plurality of sensor devices being provided in a sensor hardware abstraction layer (HAL) included in the wearable device, and
      the plurality of sensor devices including at least one potential sensor device and at least one actual sensor device;
   load a plurality of sensor drivers associated with the plurality of sensor devices on the wearable device,
      the plurality of sensor drivers including:
         at least one first sensor driver for a first sensor device of the plurality of sensor devices,
            the first sensor device not being connected to or in communication with the wearable device, and
            the first sensor device being associated with a first removable strap,
         at least one second sensor driver for a second sensor device of the plurality of sensor devices,
            the second sensor device being connected to or in communication with the wearable device,
            the second sensor device being associated with a second removable strap, and
            the second sensor device being a different type of sensor device than the first sensor device, and
         the wearable device using the at least one second sensor driver in connection with the second sensor device;

detect a connectivity event,
the connectivity event including:
a disconnection of the second sensor device from the wearable device, and
a connection of the first sensor device;
identify the first sensor device based on detecting the connectivity event;
cause the first sensor device to be used in connection with the wearable device based on detecting the connectivity event and based on identifying a first sensor associated with the first sensor device,
the first sensor device being used without rebooting the wearable device and without restarting an application, of the wearable device, that uses the first sensor device;
replace second data with first data,
the first data including data associated with the first sensor, and
the second data including data associated with a second sensor,
the second sensor being associated with the second sensor device; and
provide data associated with the first sensor device to the application of the wearable device.

8. The non-transitory computer-readable medium of claim 7, where the one or more instructions, when executed by the one or more processors, further cause the one or more processors to:
identify the application based on detecting the connectivity event and based on identifying the first sensor,
the application being responsible for providing the data for display.

9. The non-transitory computer-readable medium of claim 7, where the one or more instructions, when executed by the one or more processors, further cause the one or more processors to:
determine one or more applications associated with the first sensor; and
provide information for display that identifies the one or more applications.

10. The non-transitory computer-readable medium of claim 7, where the first sensor device is a dongle.

11. The non-transitory computer-readable medium of claim 7, where the first sensor includes at least one of:
a heart-rate sensor;
a temperature sensor; or
an ultraviolet light sensor.

12. The non-transitory computer-readable medium of claim 7, where the one or more instructions, when executed by the one or more processors, further cause the one or more processors to:
translate the first data associated with the first sensor to match a data format of the second data associated with the second sensor of the second sensor device.

13. The non-transitory computer-readable medium of claim 7, where the one or more instructions, when executed by the one or more processors, further cause the one or more processors to:
enable a feature associated with the application based on detecting the connectivity event.

14. A method, comprising:
identifying, by a wearable device, a list of a plurality of sensor devices,
the list of the plurality of sensor devices being provided in a sensor hardware abstraction layer (HAL) included in the wearable device, and
the plurality of sensor devices including at least one potential sensor device and at least one actual sensor device;
loading, by the wearable device, a plurality of sensor drivers associated with the plurality of sensor devices on the wearable device,
the plurality of sensor drivers including:
at least one first sensor driver for a first sensor device of the plurality of sensor devices,
the first sensor device not being connected to or in communication with the wearable device, and
the first sensor device being associated with a first removable strap,
at least one second sensor driver for a second sensor device of the plurality of sensor devices,
the second sensor device being connected to or in communication with the wearable device,
the second sensor device being associate with a second removable strap, and
the second sensor device being a different type of sensor device than the first sensor device, and
the wearable device using the at least one second sensor driver in connection with the second sensor device,
detecting, by the wearable device, a connectivity event,
the connectivity event including:
a disconnection of the second sensor device from the wearable device, and
a connection of the first sensor device;
identifying, by the wearable device, a first sensor based on detecting the connectivity event;
causing, by the wearable device, the first sensor device to be used in connection with the wearable device based on detecting the connectivity event and based on identifying the first sensor,
the first sensor device being used without rebooting the wearable device and without restarting an application, of the wearable device, that uses the first sensor device;
replacing, by the wearable device, second data with first data,
the first data including data associated with the first sensor, and
the second data including data associated with a second sensor,
the second sensor being associated with the second sensor device; and
providing, by the wearable device, data associated with the first sensor device for display on the wearable device.

15. The method of claim 14, further comprising:
identifying the application based on detecting the connectivity event and based on identifying the first sensor,
the application being responsible for displaying the data associated with the first sensor.

16. The method of claim 14, further comprising:
translating the first data associated with the first sensor to match a data format of the second data associated with the second sensor.

17. The method of claim 14, further comprising:
receiving information that identifies a user configuration;
identifying one or more applications based on identifying the first sensor,
the one or more applications being identified based on the user configuration; and
providing information that identifies the one or more applications for display.

18. The method of claim 14, further comprising:
enabling a feature associated with the application based on detecting the connectivity event.

19. The method of claim 14, further comprising:
providing a notification to the application,
the notification including information identifying the first sensor.

20. A wearable device, comprising:
one or more memories; and
one or more processors, communicatively coupled to the one or more memories, to:
identify a list of a plurality of sensor devices,
the list of the plurality of sensor devices being provided in a sensor hardware abstraction layer (HAL) included in the wearable device, and
the plurality of sensor devices including at least one potential sensor device and at least one actual sensor device;
load a plurality of sensor drivers associated with the plurality of sensor devices on the wearable device,
the plurality of sensor drivers including:
at least one first sensor driver for a first sensor device of the plurality of sensor devices,
the first sensor device not being connected to or in communication with the wearable device, and
the first sensor device being associated with a first removable strap,
at least one second sensor driver for a second sensor device of the plurality of sensor devices,
the second sensor device being connected to or in communication with the wearable device,
the second sensor device being associated with a second removable strap, and
the second sensor device being a different type of sensor device than the first sensor device, and
the wearable device using the at least one second sensor driver in connection with the second sensor device,
detect a connectivity event,
the connectivity event including:
a disconnection of the second sensor device from the wearable device, and
a connection of the first sensor device;
identify the first sensor device based on detecting the connectivity event;
cause the first sensor device to be used in connection with the wearable device based on detecting the connectivity event and based on identifying a first sensor associated with the first sensor device,
the first sensor device being used without rebooting the wearable device and without restarting an application, of the wearable device, that uses the first sensor device;
receive information that identifies a user configuration;
identify one or more applications based on identifying the first sensor,
the one or more applications being identified based on the user configuration;
provide information that identifies the one or more applications for display; and provide data associated with the first sensor device to the one or more applications of the wearable device.

21. A method, comprising:
identifying, by a wearable device, a list of a plurality of sensor devices,
the list of the plurality of sensor devices being provided in a sensor hardware abstraction layer (HAL) included in the wearable device, and
the plurality of sensor devices including at least one potential sensor device and at least one actual sensor device;
loading, by the wearable device, a plurality of sensor drivers associated with the plurality of sensor devices on the wearable device,
the plurality of sensor drivers including:
at least one first sensor or driver for a first sensor device of the plurality of sensor devices,
the first sensor device not being connected to or in communication with the wearable device, and
the first sensor device being associated with a first removable strap,
at least one second sensor driver for a second sensor device of the plurality of sensor devices,
the second sensor device being connected to or in communication with the wearable device,
the second sensor device being associate with a second removable strap, and
the second sensor device being a different type of sensor device than the first sensor device, and
the wearable device using the at least one second sensor driver in connection with the second sensor device,
detecting, by the wearable device, a connectivity event,
the connectivity event including:
a disconnection of the second sensor device from the wearable device, and
a connection of the first sensor device;
identifying, by the wearable device, a first sensor based on detecting the connectivity event;
causing, by the wearable device, the first sensor device to be used in connection with the wearable device based on detecting the connectivity event and based on identifying the first sensor,
the first sensor device being used without rebooting the wearable device and without restarting an application, of the wearable device, that uses the first sensor device;
receiving, by the wearable device, information that identifies a user configuration;
identifying, by the wearable device, one or more applications based on identifying the first sensor,
the one or more applications being identified based on the user configuration;
providing, by the wearable device, information that identifies the one or more applications for display; and
providing, by the wearable device, data associated with the first sensor device for display on the wearable device.

* * * * *